United States Patent

Meister et al.

Patent Number: 5,678,854
Date of Patent: *Oct. 21, 1997

[54] OCCUPANT AND INFANT SEAT DETECTION IN A VEHICLE SUPPLEMENTAL RESTRAINT SYSTEM

[75] Inventors: Jack B. Meister, Convent Station, N.J.; Bruce L. Walcott, Lexington, Ky.

[73] Assignee: Echlin, Inc., Branford, Conn.

[*] Notice: The term of this patent shall not extend beyond the expiration date of Pat. No. 5,570,903.

[21] Appl. No.: 616,696

[22] Filed: Mar. 15, 1996

Related U.S. Application Data

[62] Division of Ser. No. 391,061, Feb. 21, 1995, Pat. No. 5,570,903.

[51] Int. Cl.$^6$ .................... B60R 21/22; B60R 21/32
[52] U.S. Cl. ............ 280/735; 180/273; 280/732; 340/572; 340/667; 297/250.1
[58] Field of Search .................. 180/273, 272; 280/735, 734, 732, 730.1, 728.1; 340/667, 666, 438, 436, 572; 297/250.1, 216.11

[56] References Cited

U.S. PATENT DOCUMENTS

| | | | |
|---|---|---|---|
| 3,321,663 | 5/1967 | Poznik | 340/667 |
| 3,530,451 | 9/1970 | Devine | 340/572 |
| 3,672,699 | 6/1972 | De Windt | 280/735 |
| 3,992,028 | 11/1976 | Abe et al. | 280/728.1 |
| 4,354,562 | 10/1982 | Newman . | |
| 4,584,571 | 4/1986 | Smit et al. | 340/572 |
| 4,834,420 | 5/1989 | Sankrithi et al. | 297/250.1 |
| 5,074,583 | 12/1991 | Fujita et al. | 280/735 |
| 5,161,820 | 11/1992 | Vollmer | 180/273 |
| 5,232,243 | 8/1993 | Blackburn et al. | 180/273 |
| 5,330,226 | 7/1994 | Gentry et al. | 280/735 |
| 5,425,431 | 6/1995 | Brandt et al. | 180/273 |
| 5,454,591 | 10/1995 | Mazur et al. | 180/273 |
| 5,468,014 | 11/1995 | Gimbel et al. | 280/735 |
| 5,474,327 | 12/1995 | Schousek | 280/735 |
| 5,515,933 | 5/1996 | Meyer et al. | 180/273 |
| 5,605,348 | 2/1997 | Blackburn et al. | 280/735 |

FOREIGN PATENT DOCUMENTS

| | | | |
|---|---|---|---|
| 650869 | 5/1995 | European Pat. Off. | 280/735 |
| 4228624 | 3/1994 | Germany . | |
| 4410402 | 9/1994 | Germany | 280/735 |
| 4426677 | 2/1995 | Germany | 280/735 |
| 2236419 | 4/1991 | United Kingdom . | |

OTHER PUBLICATIONS

"Caution: Air Bags at Work," by Jerry Shine, *Popular Science*, Jun. 1994, p. 36.
European Search Report dated Jun. 6, 1996, Application No. EP96 10 2343.
"Sensor Protects Infants from Airbag Injuries," *Machine Design*, Nov. 7, 1994, p. 26.
"Child–seat and Occupant–presence Detection," *Automotive Engineering*, May 1994, p. 47.
"Method for Sensing Occupant Mass and Position," *Research Disclosure*, Jan. 1994, No. 35715.
"Passenger Side Air Bag Deployment Inhibit," *Research Disclosure*, Feb. 1994, No. 35804.

*Primary Examiner*—Brian L. Johnson
*Assistant Examiner*—Peter C. English
*Attorney, Agent, or Firm*—Barnes, Kisselle, Raisch, Choate, Whittemore & Hulbert

[57] ABSTRACT

An automotive vehicle supplemental restraint system that includes an air bag positioned within the vehicle opposite the passenger side of the front seat, and electronics coupled to one or more impact sensors for activating the air bag in the event of a vehicle impact. Occupancy sensors are provided at the passenger seat for sensing seat occupancy and inhibiting activation of the air bag when the seat is either unoccupied or occupied by a rear-facing infant seat. System status is displayed to a vehicle operator, and the operator is provided with an opportunity to override the occupancy sensors and enable activation of the air bag.

10 Claims, 3 Drawing Sheets

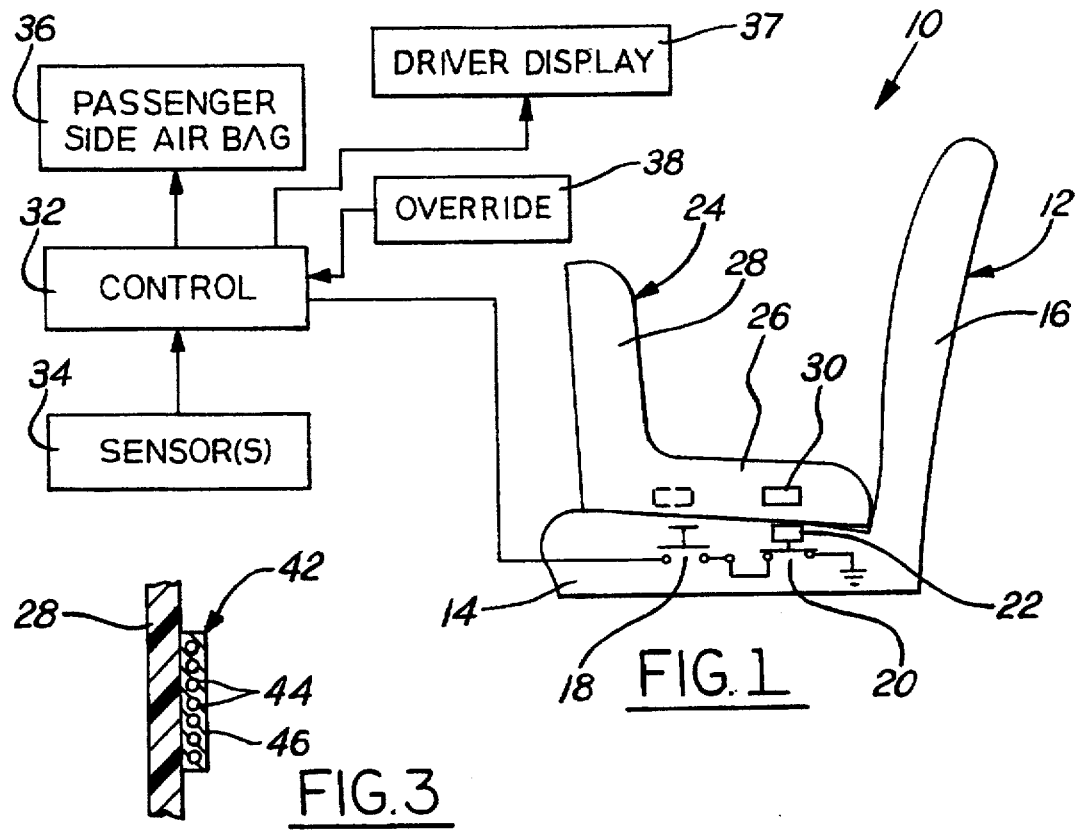
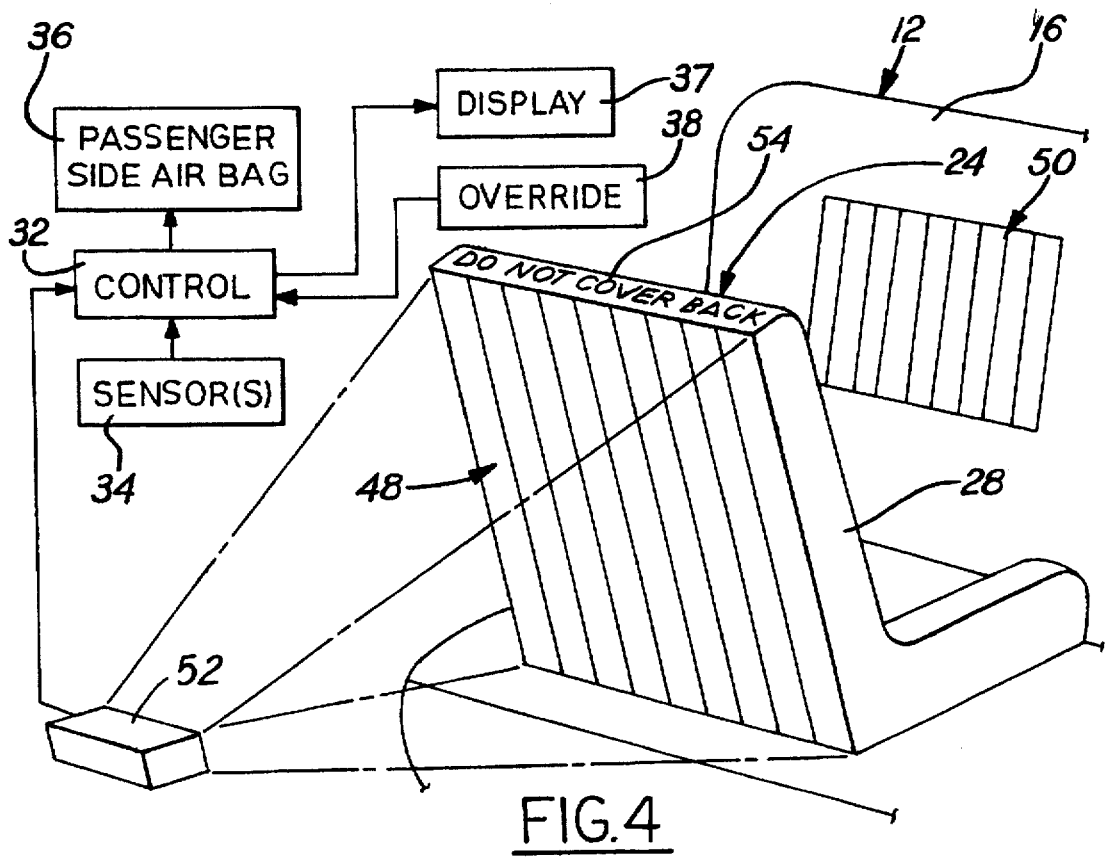

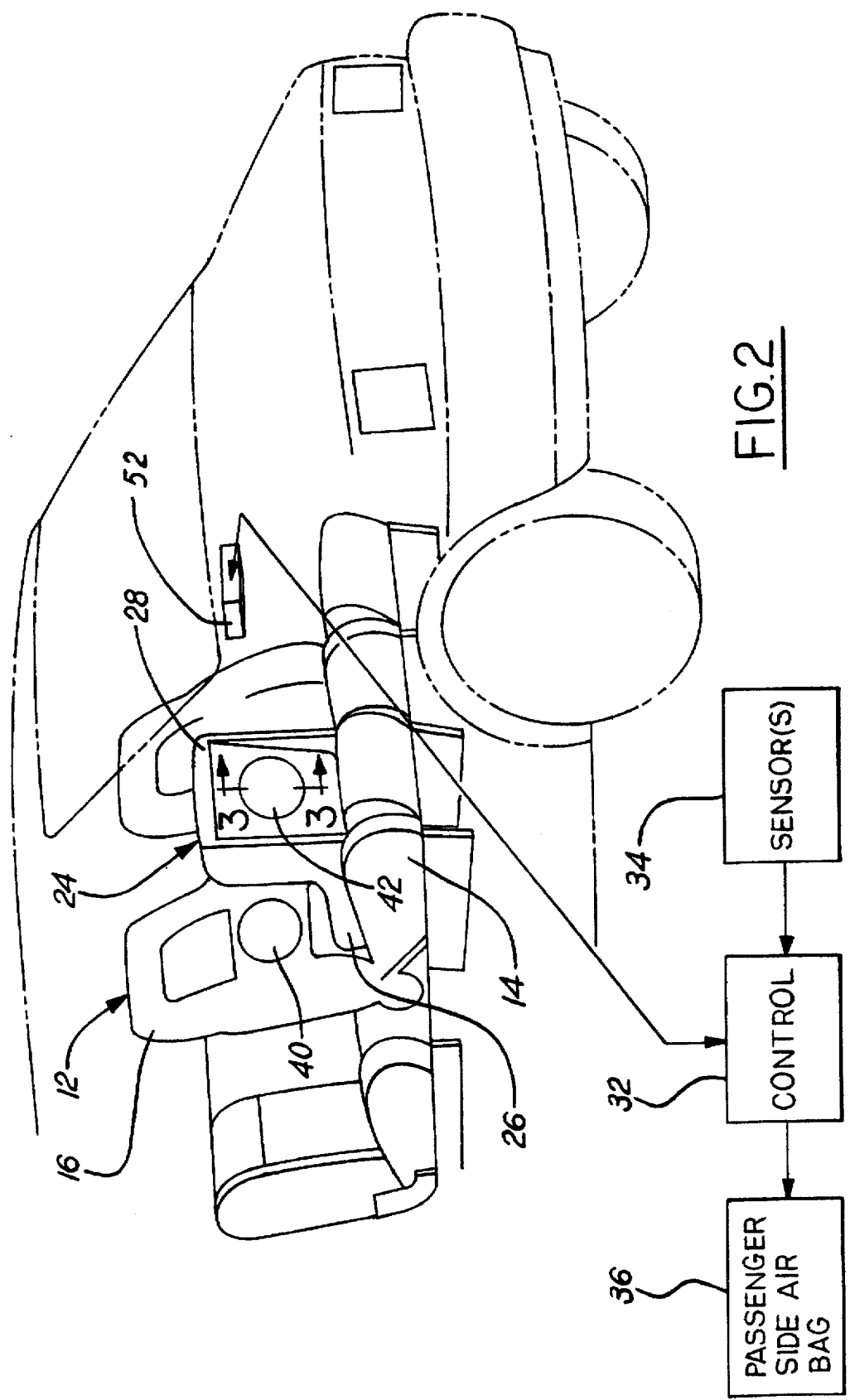

OCCUPANT AND INFANT SEAT DETECTION IN A VEHICLE SUPPLEMENTAL RESTRAINT SYSTEM

This application is a division of application Ser. No. 08/391,061 filed Feb. 21, 1995, U.S. Pat. No. 5,570,903.

The present invention is directed to air bag supplemental restraint systems for automotive vehicles, and more particularly to a method and system for preventing activation of the air bag when a vehicle seat position is unoccupied or occupied by a rear-facing infant seat.

BACKGROUND AND SUMMARY OF THE INVENTION

In an automotive vehicle with dual front-seat air bags, it is desirable to sense or detect whether or not the passenger seat is occupied. In the event that the passenger seat is unoccupied, it is desirable to avoid activation of the passenger-side air bag in the event of vehicle impact to reduce repair costs. More importantly, it is desirable to determine if the passenger side of the front-seat is occupied by a rear-facing infant seat so that activation of the air bag can be inhibited to prevent injury to the infant. Under current practice, operators of vehicles equipped with dual front-seat air bags are advised to place the infant seat in the rear vehicle seat. However, this advice often is unheeded, risking injury to the infant by deployment of the passenger-side air bag when the infant seat is placed in the front vehicle seat.

It is therefore a general object of the present invention to control deployment of a passenger-side air bag as a function of occupancy of the passenger side of the front seat. It is a more specific object of the present invention to provide a method and system to prevent deployment of the front-seat passenger-side air bag in a dual air bag system when the passenger seat is unoccupied, or when the passenger seat is occupied by a rear-facing infant seat. Another and related object in accordance with one aspect of the present invention is to provide an infant seat having facility for cooperation with a vehicle supplemental restraint system to prevent activation of the passenger-side air bag when the infant seat is disposed in a rear-facing orientation on the passenger side of the front seat.

An automotive vehicle supplemental restraint system in accordance with the present invention includes an air bag positioned within the vehicle opposite a predetermined seat position such as the passenger side of the front seat, and electronics coupled to one or more impact sensors for activating the air bag in the event of a vehicle impact. One or more occupancy sensors are provided at the passenger seat for sensing seat occupancy and inhibiting activation of the air bag when the seat is either unoccupied or occupied by a rear-facing infant seat. In the preferred embodiment of the invention, system status is displayed to a vehicle operator, and the operator is provided with an opportunity to override the occupancy sensors and enable activation of the air bag.

In one form of the invention, the occupancy sensors take the form of a first sensor for detecting seat occupancy as a function of weight supported by the seat, and a second sensor responsive to disposition of an infant seat in a rear-facing orientation. This second sensor preferably comprises a magnetic switch disposed in the passenger seat and a magnet at a predetermined position in the infant seat for activating the magnetic switch when the infant seat is disposed in a rearwardly facing orientation, and not activating the magnetic switch when the infant seat is disposed in other than a rearwardly facing orientation. The weight sensor in this embodiment of the invention comprises a normally open switch that assumes a closed condition responsive to occupant weight, and the magnetic switch comprises a normally closed switch that opens responsive to the infant seat magnet. The weight switch and the magnetic switch are connected in series so as to enable activation of the air bag when both switches are closed.

In another embodiment of the invention, the occupancy sensor comprises a plurality of weight sensors disposed in an array at the monitored seat position. In the preferred form of this embodiment, each sensor comprises a permanent magnet and a linear Hall effect sensor underlying the magnet and separated from the magnet by a resilient element such as a foam rubber pad. The array of sensors provide analog signals to an analyzer circuit which collectively provide information about seat occupancy. The analyzer circuit is programmed or calibrated to distinguish between an unoccupied seat, a seat occupied by a forward-facing passenger of any size, and a seat occupied by a rear-facing infant seat, for example.

In other embodiments of the invention, optically readable indicia, preferably in the form of reflectors or vertical code bars, is disposed on the passenger seat back and/or on the back of an infant seat. An optical sensor is mounted beneath or within the vehicle dashboard opposite the passenger-side front seat, and is connected to air bag control electronics for inhibiting activation of the air bag when the optically readable indicia is detected on either the infant seat or the passenger seat back. The optically readable indicia preferably is provided both on the back rest of the passenger-side front seat, and on the back of the infant seat. When a passenger occupies the seat, the body of the passenger blocks reading of the indicia on the seat back, so that the reader does not detect such indicia and deployment of the passenger-side air bag is enabled. Placement of an infant seat on the passenger-side front seat also blocks the indicia on the back of the passenger seat. However, the indicia is also provided on the back of the infant seat, so that the reader detects such indicia and inhibits deployment of the passenger-side air bag as if the seat were unoccupied.

In accordance with another aspect of the present invention, there is provided an infant seat having a base, a generally L-shaped seat structure with an interior for holding an infant, and a seat back. In one embodiment, a magnet is disposed within the base of the infant seat for cooperation with a magnetic sensor in a vehicle seat to detect orientation of the infant seat when placed in the vehicle. In another embodiment of the invention, optically readable indicia is permanently exteriorly affixed to the seat back and oriented to face the vehicle dashboard when the seat is positioned in a vehicle passenger-side front seat with the interior of the seat facing rearwardly.

BRIEF DESCRIPTION OF THE DRAWINGS

The invention, together with additional objects, features and advantages thereof, will be best understood from the following description, the appended claims and the accompanying drawings, in which:

FIG. 1 is a schematic diagram of a passenger-side front-seat supplemental restraint system in accordance with one presently preferred embodiment of the invention;

FIG. 2 is a schematic diagram of a passenger-side front-seat supplemental restraint system in accordance with a second embodiment of the invention;

FIG. 3 is a fragmentary sectional view taken substantially along the line 3—3 in FIG. 2;

FIG. 4 is a schematic diagram of a passenger-side front-seat supplemental restraint system in accordance with a third embodiment of the invention;

DETAILED DESCRIPTION OF PREFERRED EMBODIMENTS

Figure 5:
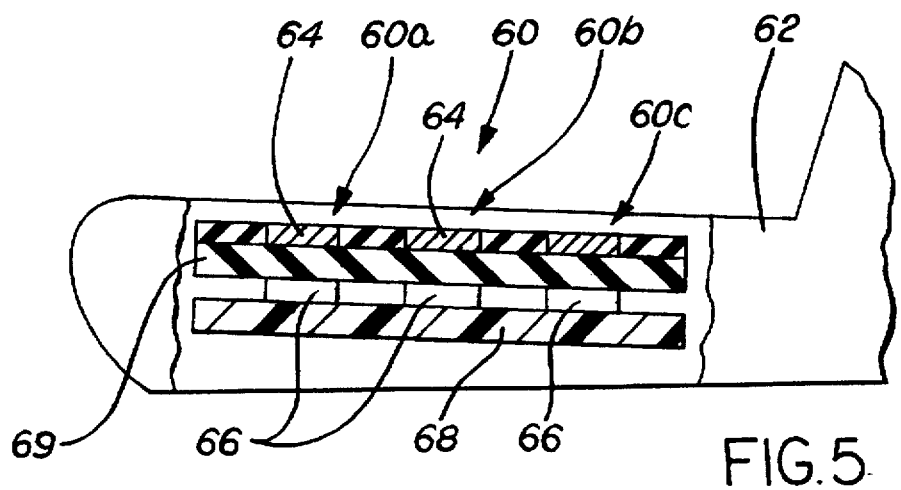
FIG. 5 is a fragmentary sectional view of a vehicle passenger seat equipped with an occupant sensor in accordance with another embodiment of the invention.

FIG. 1 illustrates a vehicle supplemental restraint system 10 associated with the passenger side of an automotive vehicle front seat 12. Seat 12 has the usual horizontal seat base or bench portion 14 and a seat back or back rest portion 16. A normally open weight sensor switch 18 is disposed in seat base 14 so as to be responsive to weight supported by seat base 14 for closing the normally open switch contacts. A magnetic switch 20 is also disposed in seat base 14. Switch 20 has normally closed switch contacts coupled to a ferromagnetic element 22. The contacts of switches 18,20 are connected in series. An infant seat 24 is positionable on passenger seat 12. Infant seat 24 includes the usual generally L-shaped seat structure having a base 26, a back 28 and an interior with suitable straps, etc. for holding an infant. A permanent magnet 30 is disposed within seat base 26 at a predetermined position coordinated with position of magnetic switch 20 within seat base 14 so as to activate switch 20 when infant seat 24 is placed on seat 12 in the rearwardly facing orientation illustrated in FIG. 1, but not activate switch 20 at any other infant seat orientation. In the orientation of FIG. 1, magnet 30 attracts ferromagnetic element 22 and opens the normally closed contacts of magnetic switch 20 when infant seat 24 is placed in the position and orientation shown.

Switches 18,20 are connected in series to control electronics 32, which receives one or more inputs from suitable impact sensors 34 for controlling deployment of a passenger-side air bag 36. Air bag 36 is, of course, disposed in the vehicle dashboard opposite passenger seat 12 for deployment to protect a passenger seat occupant in the event of vehicle impact. Operation of control electronics 32 to activate air bag 36 responsive to sensors 34 is enabled when both switches 18,20 are closed. That is, when weight sensor switch 18 is closed responsive to weight of a seat occupant, and infant seat orientation sensor 20 remains closed, operation of the air bag is enabled. When switch 18 is open, meaning that there is no occupant of passenger seat 12, air bag deployment is disabled. Likewise, when switch 20 is opened, meaning that a rear-facing infant seat 24 is positioned on seat 12, air bag deployment is disabled.

Control electronics 32 is coupled to a vehicle operator display 37 for advising the vehicle operator that air bag deployment has been disabled. An override switch 38 is coupled to control electronics 32 to permit the vehicle operator to override occupant sensor switch 18 and infant seat orientation switch 20, and enable deployment of the air bag independent of the switches. Magnetic switch 20 may be replaced by other magnet-responsive elements, such as Hall-effect elements or magnetoresistive elements having electrical resistance characteristics that vary as a function of magnetic field. However, the normally closed on/off switch construction 20 illustrated in FIG. 1 is preferred by reason of simplicity and economy.

FIGS. 2 and 3 illustrate a modified embodiment of the invention in which optically readable graphic indicia in the form of a circular reflector 40,42 are provided on the front surface of seat back 16 and the back of infant seat back 28 respectively. Reflector 42 (and reflector 40) is illustrated in FIG. 3 as comprising a multiplicity of glass microspheres 44 imbedded in a transparent matrix 46. An optical sensor 52 (FIG. 2) is positioned within or beneath the vehicle dashboard opposite passenger seat 12, and is responsive to optical energy reflected from reflectors 40,42. Sensor 52 preferably is responsive to reflected infrared energy, and at least reflector 40 on seat back 16 may be entirely invisible to the eye. Sensor 52 is coupled to air bag control electronics 32, which is responsive to one or more sensors 34 for activating passenger side air bag 36 as discussed in connection with FIG. 1.

In the event that passenger seat 12 is unoccupied, sensor 52 detects reflector 40 on passenger-seat back 16, and inhibits deployment of air bag 36 through control electronics 32. However, when passenger seat 12 is occupied by a passenger, the passenger's body blocks reflector 40, and sensor 52 enables activation of passenger-side air bag 36. When infant seat 24 is strapped in position in passenger seat 12, the infant seat also blocks reflector 40. However, sensor 52 is responsive to reflector 42 on the back of the infant seat to inhibit operation of air bag 36.

FIG. 4 illustrates a modification to the embodiment of FIGS. 2 and 3. The optically readable graphic indicia permanently affixed to seat back 16 and back 28 of infant seat 24 in this embodiment of the invention takes the form of bar code indicia 48,50, which preferably are but need not necessarily be identical. Optical sensor 52 in this embodiment of the invention takes the form of a bar code scanner, disposed within or beneath the vehicle dashboard. Bar code indicia 48 on infant seat 24, like optical reflector 42 in the embodiment of FIGS. 2 and 3, is permanently affixed to the outside surface of the infant seat back so as to face forwardly toward the vehicle dashboard when the infant seat is strapped in the rearwardly facing orientation as illustrated. A legend 54 is permanently affixed to the top edge of infant seat 24 warning users not to cover bar code indicia 48 (or reflector 42 in the embodiment of FIGS. 2-3). Scanner 52 may be of any suitable conventional type. In the event that the passenger seat is unoccupied, scanner 52 detects bar code indicia 50 on passenger seat back 16 and inhibits deployment of air bag 36 through control electronics 30. However, when passenger seat 12 is occupied by a passenger, the passengers body blocks bar code indicia 50 and scanner 52 enables activation of the passenger-side air bag. When infant seat 24 is strapped in position in passenger seat 12, the infant seat also blocks indicia 50. However, scanner 52 reads indicia 48 on the back of the infant seat, and inhibits operation of air bag 36. Where bar code indicia 48 is the same as bar code indicia 50, scanner 52 treats presence of the infant seat the same as an unoccupied passenger seat. Occupancy or non-occupancy of the passenger seat may be indicated to the vehicle operator at display 37, which preferably is part of the vehicle operator dashboard display.

As noted above, bar code indicia 48,50 preferably are identical. However, bar code indicia 48 on infant seat 24 may be different from bar code indicia 50 on passenger seat 12, so that scanner 52 and control electronics 32 can detect the difference between an unoccupied passenger seat and a passenger seat occupied by an infant seat, and provide a suitable display at 37 to the vehicle operator. Scanner 52 may operate continuously, periodically or when the vehicle engine is initially started. Indicia 50 on passenger-seat back 16 preferably is of a type invisible to the human eye so as not to affect the aesthetics of the vehicle interior. Indicia 48 on infant seat 24 may likewise be invisible, or may be of a visible character so as to provide a reminder to a user to position the seat in proper orientation.

Figure 6:
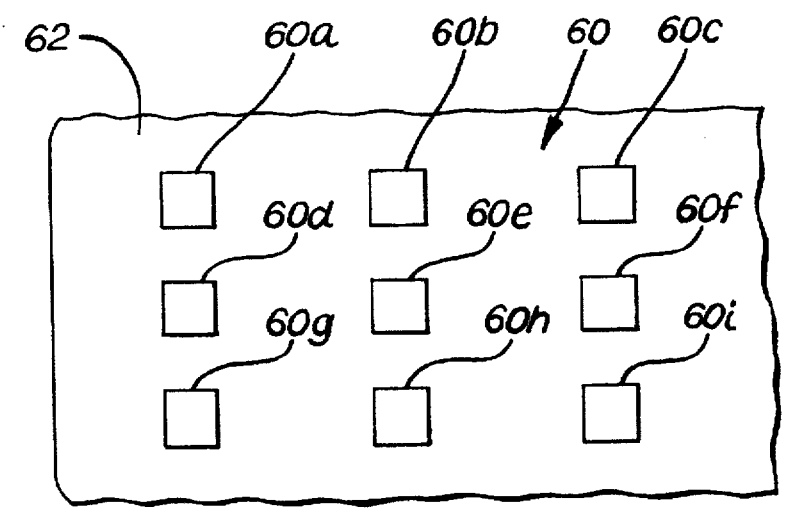
FIG. 6 is a fragmentary plan view of the seat illustrated in FIG. 5.
Figure 7:
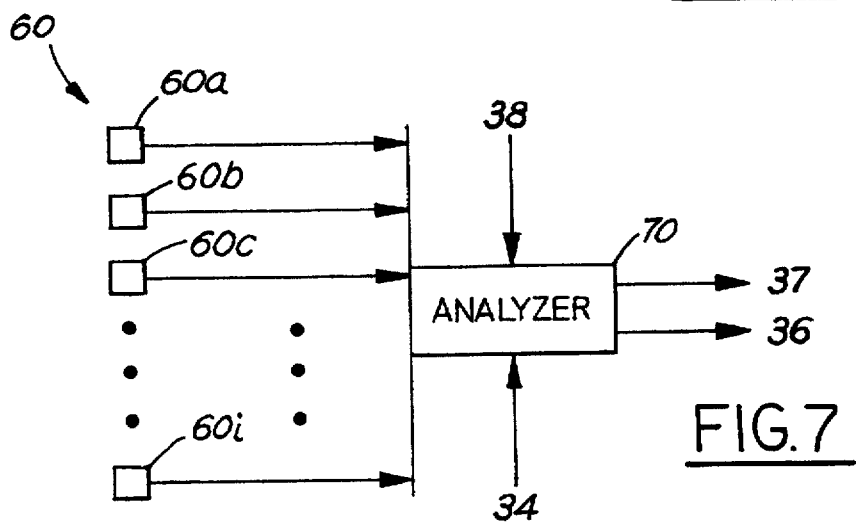
FIG. 7 is a functional block diagram of a system that utilizes the sensor of FIGS. 5–6.

FIGS. 5-7 illustrate another embodiment of the invention that has the advantage, as compared with the embodiments of FIGS. 1-4, of not requiring a modified or special infant seat. A plurality of occupancy sensors 60a-60i are disposed within passenger-side seat 62 in an array 60, such as a rectangular array illustrated in the drawings by way of example. Sensors 60a-60i of array 60 comprise a plurality of permanent magnets 64 captured in a sheet or matrix of foam rubber, for example. A corresponding plurality of linear Hall effect sensors 66 are mounted on a semi-rigid plate 68 of plastic, for example. Each sensor 66 is disposed beneath a corresponding magnet 64 and is spaced therefrom by a resilient rubber sheet 69. Each sensor 66 provides an electrical output signal that varies as a linear or substantially linear function of proximity of the corresponding magnet 64—i.e., spacing between sensor 66 and magnet 64.

Sensors 60a-60i are all connected to corresponding individual inputs of an analyzer circuit 70 (FIG. 7). Analyzer circuit 70 may comprise a microprocessor that is programmed or calibrated to identify and distinguish among seat occupancy situations. For example, analyzer 70 may distinguish among: (a) a rear-facing infant seat, (b) a front-facing infant seat, (c) the weight of an occupant, (d) the position of the occupant, and (e) the absence of an occupant. Presence of a rear-facing infant seat or absence of an occupant would inhibit air bag deployment. Information as to weight and position of the occupant may be used to time air bag deployment.

The supplemental restraint system of the present invention may be provided in the vehicle at the time of original manufacture, or as an aftermarket accessory in the embodiments of FIGS. 2-4. In aftermarket applications, the optical sensor would typically be mounted beneath the dashboard on the passenger side, and display 37 would be part of the sensor package. In such aftermarket applications, seat back indicia 40 or 50 may be added to the vehicle, or indicia 40,50 may be eliminated so that the optical sensor is responsive only to the infant seat. In this application, the sensor and control electronics would still prevent deployment of the air bag when the infant seat is present, but not when the seat is unoccupied. The scanner and deployment control electronics may be marketed as a package with the infant seat.

We claim:

1. An automotive vehicle supplemental restraint system that includes: an air bag positioned within a vehicle opposite a predetermined vehicle seat position, means for activating the air bag in the event of vehicle impact, and deployment control means for preventing activation of the air bag when the seat is unoccupied or occupied by a rear-facing infant seat, said deployment control means comprising:

first means for positioning at said predetermined vehicle seat position to sense occupancy of said seat position, second means for disposition at a predetermined position on an infant seat and third means at said predetermined vehicle seat position responsive to positioning of said second means at said vehicle seat position for indicating orientation of the infant seat at said predetermined vehicle seat position, fourth means coupled to said first and third means for inhibiting deployment of said air bag when a rear-facing infant seat is disposed at said predetermined vehicle seat position, and otherwise enabling deployment of said air bag when said predetermined vehicle seat position is occupied as indicated by said first means and said third means does not indicate a rear-facing infant seat at said predetermined vehicle seat position, fifth means responsive to said fourth means for indicating to a vehicle operator that deployment of said air bag has been inhibited by said fourth means, and sixth means for a vehicle operator to override said fourth means and enable deployment of said air bag independent of said first and second means.

2. The system set forth in claim 1 wherein said first means comprises switch means disposed at said predetermined vehicle seat position having a normally open switch condition and being responsive to weight supported at said predetermined vehicle seat position for assuming a closed switch condition.

3. The system set forth in claim 1 wherein said third means comprises switch means disposed at said predetermined vehicle seat position, and wherein said second means comprises switch activating means disposed at said predetermined position on said infant seat for activating said switch means when said infant seat is disposed facing rearwardly at said predetermined vehicle seat position.

4. The system set forth in claim 3 wherein said switch means comprises magnetic switch means, and said switch activating means comprises a magnet at said predetermined position on said infant seat.

5. The system set forth in claim 3 wherein said switch means of said third means has a normally closed switch condition, and assumes an open switch condition in response to said switch activating means.

6. The system set forth in claim 5 wherein said first means comprises switch means disposed at said predetermined vehicle seat position having a normally open switch condition and being responsive to weight supported at said predetermined vehicle seat position for assuming a closed switch condition.

7. The system set forth in claim 6 wherein said switch means of said first and third means are connected in series for inhibiting activation of said air bag when either of said switch means is in an open switch condition and enabling activation of said air bag when both of said switch means are in a closed switch condition.

8. In an automotive vehicle supplemental restraint system that includes an air bag positioned within the vehicle opposite a predetermined vehicle seat position and means for activating the air bag in the event of vehicle impact, a method of preventing activation of the air bag in the event that an infant seat is positioned at said predetermined vehicle seat position, said method comprising the steps of:

(a) providing magnetic means on the infant seat, (b) providing magnetic sensing means in the vehicle at a position to detect said magnetic means on the infant seat when the infant seat is positioned at said predetermined vehicle seat position, (c) inhibiting activation of the air bag opposite said predetermined vehicle seat position when the magnetic means is detected in said step (b), (d) indicating to a vehicle operator that said magnetic means is detected in said step (b) and activation of the air bag is inhibited in said step (c), and (e) providing means for the vehicle operator to override said step (c) and enable activation of said air bag independent of said steps (a) and (b).

9. An automotive vehicle supplemental restraint system that includes: an air bag positioned within a vehicle opposite a predetermined vehicle seat position, means for activating the air bag in the event of vehicle impact, and deployment control means for preventing activation of the air bag when the seat is unoccupied or occupied by a rear-facing infant seat, said deployment control means comprising:

first means for positioning at said predetermined vehicle seat position to sense occupancy of said seat position, second means including optically readable means affixed at a predetermined position on an infant seat, third means including optical reading means disposed opposite said predetermined vehicle seat position responsive to said optically readable means on a rearwardly facing infant seat at said vehicle seat position for indicating rear-facing orientation of the infant seat at said predetermined vehicle seat position, fourth means coupled to said first and third means for inhibiting deployment of said air bag when a rear-facing infant seat is disposed at said predetermined vehicle seat position, and otherwise enabling deployment of said air bag when said predetermined vehicle seat position is occupied as indicated by said first means and said third means does not indicate a rear-facing infant seat at said predetermined vehicle seat position, fifth means responsive to said fourth means for indicating to a vehicle operator that deployment of said air bag has been inhibited by said fourth means, and sixth means for a vehicle operator to override said fourth means and enable deployment of said air bag independent of said first and second means.

10. The system set forth in claim 9 wherein said first means comprises optically readable means affixed to the vehicle seat at said predetermined vehicle seat position and said optical reading means which, in addition to sensing a rearwardly facing infant seat, also senses occupancy of said predetermined seat position when said optically readable means at said predetermined vehicle seat position is blocked by a seat occupant.

* * * * *